Sept. 1, 1936.   W. TAYLOR   2,053,231
SCREW MECHANISMS FOR FOCUSING OPTICAL INSTRUMENTS OR FOR OTHER PURPOSES
Filed Aug. 31, 1935   2 Sheets-Sheet 2
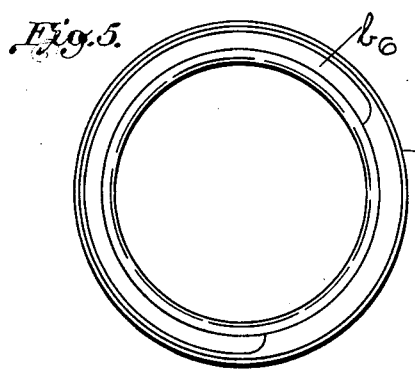
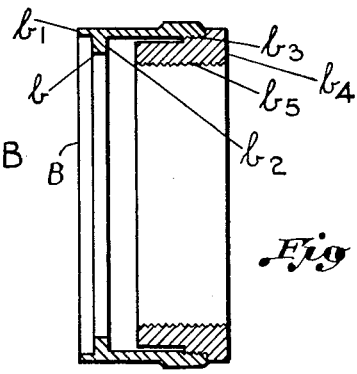
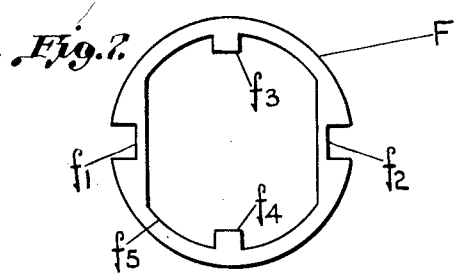
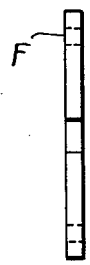
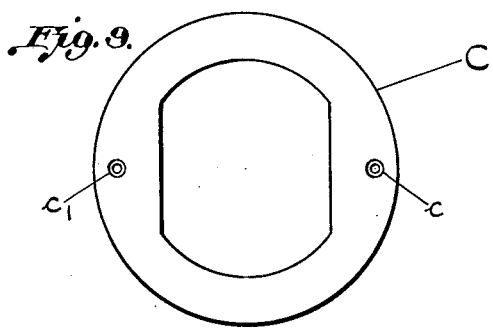
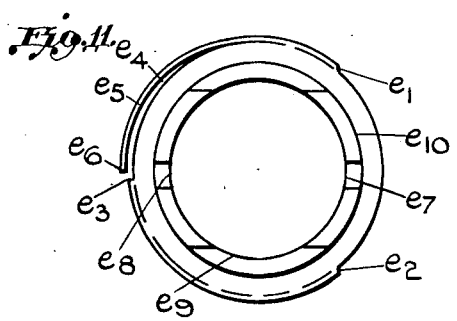
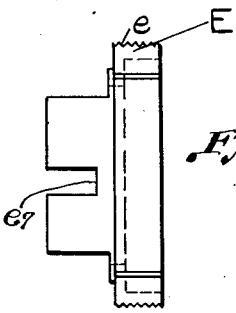
INVENTOR.
William Taylor
By Arthur L. Kent
his ATTORNEY.

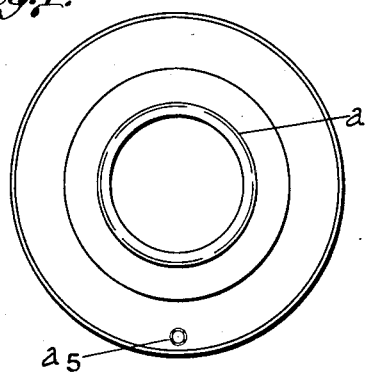
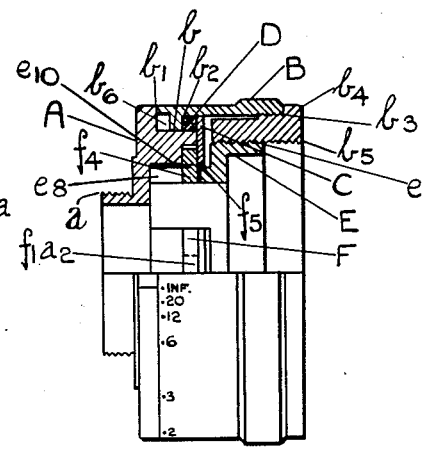
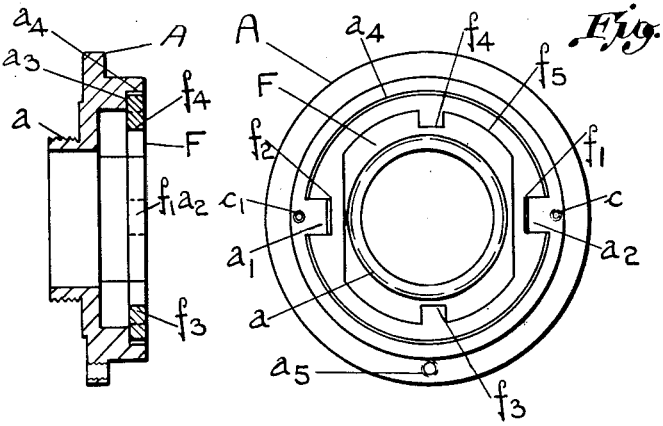

Patented Sept. 1, 1936

2,053,231

UNITED STATES PATENT OFFICE 2,053,231

SCREW MECHANISMS FOR FOCUSING OPTICAL INSTRUMENTS OR FOR OTHER PURPOSES

William Taylor, Leicester, England, assignor to Kapella Limited, Leicester, England, a corporation of England Application August 31, 1935, Serial No. 38,719
In Great Britain September 4, 1934

5 Claims. (Cl. 95—45)

This invention relates to precision screw mechanisms of the kind comprising a fixed member, a rotatable member mounted for rotation thereon, and a slidable member adapted to be moved longitudinally along the axis of the rotatable member by such rotation. Such mechanism is needed particularly in optical apparatus as a means of focusing and, for example, in connection with camera lenses.

Mechanism of this kind as hitherto constructed has generally comprised a fixed member with an exterior thread, a rotatable member threaded internally to engage said exterior thread so that the member, while rotating, has some translation along its axis, and the sliding member, adapted to slide on a cylindrical and key-wayed portion of the fixed member, has been provided with a feather to engage the key-way and prevent rotation, and the rotatable member has been connected to the sliding member by a co-acting pair of screw threads of pitch different from that of the aforesaid thread on the fixed member.

Such a mechanism has the defect that, as the direction of rotation of the rotatable member is reversed, the sliding member is moved somewhat to one side of its true position, and this arises because of the eccentricity of the key and its unbalanced action whose effect is to move the sliding member from one side to the other of its normal concentric position. It turns, as far as any slight looseness of fit permits, about the key as a fixed centre and not about the common axis of symmetry. It has also the defect that the duty of preserving the axis of the slidable member without lateral displacement or tilt is borne both by the cylindrical fitting between the slidable and fixed members and by the screwed fittings of the rotatable member, and these interfere with one another unless the fittings are free, in which case backlash is inevitable and lateral looseness probable.

The object of the present invention is to remedy these defects by improved design of the parts of the mechanism, to provide what I term a balanced key, improved axial constraint of the rotatable member and of the sliding member, and to effect other improvements.

I will describe my invention by reference to the accompanying drawings, in which:—

Fig. 1 is a rear elevation of a complete screw mechanism according to the invention;

Fig. 2 is a side elevation, the upper part in axial section, of the same;

Fig. 3 is an axial section of a fixed member adapted for attachment to a camera and containing a balanced key member;

Fig. 4 is a front elevation of the same;

Fig. 5 is a front elevation of a rotatable member for the mechanism;

Fig. 6 is an axial section of the same;

Fig. 7 is a front elevation of a balanced key;

Fig. 8 is a side elevation of the same;

Fig. 9 is a front elevation of an annular retaing plate for both the balanced key and the rotatable member;

Fig. 10 is a side elevation of the same;

Fig. 11 is a front elevation of a slidable member; and

Fig. 12 is a side elevation of the same.

In the drawings, A is the fixed member adapted to be fixed to a camera by means of the screw thread $a$. B is the rotatable member mounted rotatably on the fixed member A, being constrained thereon by their co-acting cylindrical surfaces $b$ and the shoulder $b_1$ against which the end of the rotatable member B is held by elastic pressure means comprising the annular retaining plate C which is secured to the fixed member by two screws at $c$ $c_1$. The annular retaining plate C may be bent to act as a spring against a shoulder $b_2$ of the rotatable member B, but I prefer to place between the plate and said shoulder a cork ring D under elastic compression, as this serves both as a spring to press the rotatable member against the shoulder $b_1$ and to provide desirable friction between the rotatable member and the fixed member. On the member B, and fixed preferably by screwing them together permanently by the threads $b_3$, is an internal threaded portion $b_4$, its internal thread $b_5$ being accurately concentric with the axis of rotation of the member B. This I shall hereafter refer to as the common axis. The object of attaching the portion $b_4$ to the member B instead of making them integral with one another is mainly a matter of convenience in assembly. Threaded within the screw $b_5$ is the slidable member E whose exterior threaded portion $e$ is preferably so made that it bears in the co-acting screw thread $b_5$ at three substantially equidistant points, and this I prefer to secure by removing the whole of the thread $e$ between the points $e_1$ and $e_2$ approximately 110 to 120 degrees apart, by slitting the member longitudinally at $e_3$ and along a circular arc $e_4$ so that a tongue $e_5$ is formed. Its free end $e_6$ is permanently set outwards and the tongue acts as a spring whereby the member is constrained within the rotatable member under elastic pressure substantially equal at the three points $e_1$, $e_2$, $e_6$. To prevent rotation of the slidable member E as the rotatable member B is rotated, the fixed member A is provided with two inwardly projecting lugs $a_1$ $a_2$ which act as feathers. Their sides are in parallel planes parallel to the common axis, and the lugs are preferably diametrically opposite to one another or approximately so. Fitting slidably on the parallel sides of the lugs $a_1$ $a_2$ is an annular balanced key F notched in its peripheral edge at $f$ $f_1$ to fit the lugs $a_1$ $a_2$ aforesaid, but the notches are sufficiently deep and the peripheral edge of the balanced key has sufficient freedom in the fixed member A to permit the key to slide radially in the member A, although without rotation, to an extent sufficient to cover the aggregate errors of concentricity of the various members. The balanced key F has, in turn, two inwardly projecting lugs $f_3$ $f_4$ with parallel sides in planes parallel to one another, normal to the surface of the balanced key, intermediate between the notches $f_1$ $f_2$, and preferably in one plane therewith and not displaced relative to the others along the common axis. The lugs $f_3$ $f_4$ in the balanced key F constitute feathers which engage longitudinal slots $e_7$ $e_8$, in the tubular hub $e_9$ of the slidable member E. The peripheral surface $e_{10}$ of the slidable member E is smaller than the bore $f_5$ of the balanced key F so that it has freedom to move radially in the balanced key and retaining plate as aforesaid, to cover the aggregate errors of concentricity of the various members.

Means are desirable to constrain the key in a position normal to the common axis, and this may be accomplished, when space permits, merely by making the balanced key and the feathers of sufficient thickness longitudinally; but, as in the case illustrated, where space is restricted, we may constrain the ring as by placing it between a shoulder $a_3$ formed in the recess $a_4$ in the fixed member A and the annular retaining plate C, but so that it is free to float radially. Means such as the arcuate slot $b_6$ in the face of the rotatable member B and the pin $a_5$, fixed in the member A and adapted to abut against the ends of said arcuate slot, are provided to prevent overturning of the rotatable member B.

I am aware that numerous changes in construction can be made without departing from the principles of my invention and I do not desire to limit the scope of my claims except as required by the prior art.

What is claimed is:

1. In a precision screw mechanism, the combination of a fixed member, a rotatable member rotatable thereon and screw threaded concentrically to the axis of such rotation, a slidable member adapted to engage the thread in the rotatable member and to be moved longitudinally by the rotation thereof, and a balanced key engaging the slidable member and the fixed member to constrain the slidable member against rotation.

2. In a precision screw mechanism, the combination of a fixed member, a rotatable member rotatable thereon and screw threaded concentrically to the axis of such rotation, a slidable member adapted to engage the thread in the rotatable member and supported wholly by the rotatable member and to be moved longitudinally by the rotation thereof, and a balanced key engaging the slidable member and the fixed member to constrain the slidable member against rotation.

3. In a precision screw mechanism, the combination of a fixed member, a slidable member, and a balanced key adapted to constrain the slidable member against rotation relative to the fixed member, a rotatable member, a screw thread thereon adapted to co-operate with a thread on the slidable member, the rotatable member being constrained for rotation without longitudinal movement on the fixed member by means including co-acting cylindrical surfaces on the rotatable member and the fixed member, a shoulder on one and a co-acting bearing surface on the other, and elastic pressure means for holding the shoulder and the surface in co-operative relation.

4. A precision screw mechanism comprising in combination a fixed member, a rotatable member adapted for rotation on the fixed member, a slidable member carried wholly by said rotatable member V-screw threaded to co-operate with a screw thread in the rotatable member and so formed that it bears in the rotatable member at three points approximately at equal angular separation, elastic pressure means by which the slidable member at one of said points is urged radially toward the rotatable member so as to remove all shake between the two members, and a balanced key to constrain the slidable member against rotation on the fixed member.

5. In a precision screw mechanism, the combination of a fixed member, a slidable member, and a balanced key adapted to constrain the slidable member against rotation relative to the fixed member, a rotatable member, a screw thread thereon adapted to co-operate with a thread on the slidable member, the rotatable member being constrained for rotation without longitudinal movement on the fixed member by means including co-operating elements on the rotatable and fixed members so formed as to constrain the rotatable member to rotate on the fixed member on a fixed axis, and elastic pressure means for holding the elements together.

WILLIAM TAYLOR.